No Printed Specification Available
6164X
E. Skinner.
Gridiron.
Patented Oct. 1, 1830.
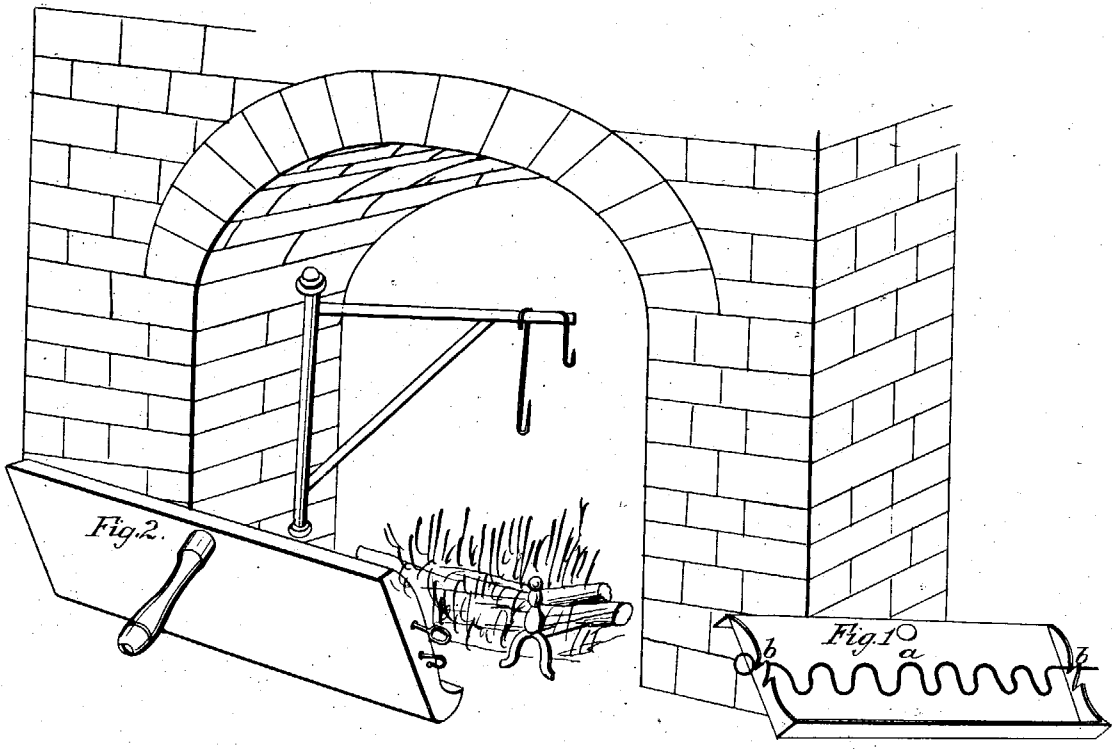

Elijah Skinner, of Sandwich. N. 76. 6164X
Letters Patent

The schedule referred to in these Letters Patent and making part of the same, containing a description in the words of the said Elijah Skinner himself, of his im-provement called the "Baking Iron". -

---

Be it known that I Elijah Skinner of the Town of Sandwich, in the County of Strafford, and State of New Hampshire, have invented a new and useful improvement being an instrument, constructed and improved from the common tin broiler and tin kitchen, called the "Baking Iron", to be used before the fire for the purpose of baking, toasting or broiling with one and the same instrument, which can be used for either purpose, and that the following, I think, is a full and exact description of the construction and application of the said instrument as invented or improved by me. This Baking Iron is constructed of sheet iron or any other suitable metallic substance, from eighteen to thirty inches in length and from six to ten inches in height or width, forming in its shape an oblong square. One side of said square is turned up extending its whole length to form the bottom of the baking iron, and the ends are turned inwards so as to meet the side turned up at its corners where they are rivetted and bronzed and said bottom side forms a pan from one and one half to three inches in width and one inch in depth to be constructed of any shape to suit the fancy. The other or upper side of the square is turned back about one half inch in angular form to stiffen the work in, and the whole baking iron is constructed to sit slanting back so as to form an obtuse angle with the fire place, and is supported in this position by means of a turned wooden handle, having a mitre cut at one end, and fastened with screws or otherwise to the back side of the baking iron, under the upper edge that is turned back, and when the iron is long a wooden handle is used at each corner in the same position, as before described. an iron handle may be used but wood is preferable. Then at the ends of the baking iron holes or niches are made through which a large wire passes, one end of which wire is shaped into a ring, and the other into a hook and extends the whole length of the baking iron, on the

[illegible]

6164X outside, or the wire may be bent so as to form two or more parallel wires extending the whole length of the baking iron, at a small distance between each other — The object and intention of this improvement is to construct a cheap and convenient instrument to set before the fire for the purpose of setting in plates for baking, or for toasting or broiling &c. and thereby lessen the expense of separate instruments for each of these purposes — The slanting or angular position of the iron, renders it more convenient for baking, the wooden handle braces and supports it in its proper position and is preferable to a metallic one because it is cheaper made and is not so great a conductor of heat — The long straight wire is for the purpose of broiling, between which and the baking iron, the article to be broiled may conveniently be placed, it can be taken out at pleas-ure, when used for other purposes than broiling.

The position also on which the iron sits, and the construction of the pan at the bottom, are such as renders both convenient, to set in plates for baking, and also to save the fat when broiling — What I consider as new and my own inven-tion is the construction of the instrument, as described in the specification, cheap and easy made varying from a tin kitchen and broiler, so that one cheap instrument may supply the place of a Cake block, Toast iron, gridiron and broiler —

Witnesses
Warren Dearborn
Aaron B. Hoyt

Elijah Skinner

Exd.
W.G.C.

Patented 1st October 1830
(Drawing made)